MILLIMETER WAVE CRYSTAL RECTIFIER

Filed Dec. 18, 1957 2 Sheets-Sheet 1

INVENTOR
W. M. SHARPLESS
BY Roy M. Porter Jr.
ATTORNEY

INVENTOR
W. M. SHARPLESS
BY Ray M. Porter, Jr.
ATTORNEY 2,956,160
Patented Oct. 11, 1960

2,956,160

MILLIMETER WAVE CRYSTAL RECTIFIER

William M. Sharpless, Fair Haven, N.J., assignor to Bell Telephone Laboratories, Incorporated, New York, N.Y., a corporation of New York Filed Dec. 18, 1957, Ser. No. 703,700
2 Claims. (Cl. 250—31)

This invention relates to electromagnetic wave devices and more particularly to broad band crystal detectors for use as frequency converters, mixers and demodulators at very short wavelengths.

Many characteristics of the point contact type crystal rectifying device have made its use very desirable in the microwave range. Crystal rectifying units are compact, stable devices which are superior in many applications to the vacuum tube diode. Its most extensive use up to now has been as a frequency converter in microwave systems, where its performance has not been equalled. At these high frequencies, however, the impedance of the crystal rectifier, which is a complex function of frequency, is a characteristic of prime importance. Impedance mismatch at the signal frequency not only results in signal loss due to reflections, but mismatches also affect the intermediate frequency impedance seen at the intermediate frequency terminals. This means that equipment must be designed with adjustments to correct both the resistive and the reactive components of the crystal impedance. Various types of crystal arrangements have been utilized including a removable coaxial cartridge located in the path of the wave energy along with the necessary reactive elements, such as tuning screws, to accomplish impedance matching. As the frequency range has been extended toward the millimeter wave range, however, the existing coaxial cartridge arrangements have not proved satisfactory. The high losses and distributed capacity associated with the encasing materials used, the band narrowing effects of the tuning screws and their increased loss and instability have proved to be substantially limiting factors. At best, impedance matching using these techniques can be achieved only over a limited bandwidth.

It is, therefore, an object of this invention to neutralize over a broad frequency band, the inherent complex impedance of a point contact rectifying device by the addition of compensating impedances.

It is a further object of this invention to incorporate such compensating impedances as an integral part of a cartridge type structure enclosing the point contact rectifier whereby the resulting impedance of such combination is resistive over a very broad frequency band.

It is a feature of the invention that the cartridge, in addition to supporting and protecting the point contact crystal as taught in the prior art, supplants the tuning screws formerly used for impedance matching purposes. Furthermore, the neutralizing impedances incorporated into the cartridge structure tends to provide impedance matching over a broad frequency band in contrast to the prior art tuning arrangements which were in general narrow band devices.

In accordance with the present invention, the usual point contact crystal arrangement is mounted in a symmetrical cartridge type structure of special design in which the conductive end members of the cartridge form built-in compensating impedances that tend to neutralize the impedance variations of the crystal and its contact over a broad frequency band. In a specific preferred embodiment, these end members take the form of conductive cylindrical members each having an annular recess in one end thereof which forms and separates an outer conductive ring from an inner center post. Two such members are spaced and supported by a low loss nonconducting hollow cylinder that surrounds the posts and is received in the recesses. The crystal element is supported at the end of one of two posts. The second post supports a point contact spring which makes contact with the crystal to form the rectifying junction. The junction so formed has an equivalent circuit consisting of a parallel resistor-capacitor combination in series with an inductor and a resistor, all in parallel with a second capacitor. However, by virtue of the small size of the point contact combination here provided, the equivalent circuit can be reduced to essentially a resistor-capacitor combination. Thus, by proportioning the physical dimensions of each end member, that is the sizes of the recess, the center post and the conductive ring, compensating impedances consisting of an inductance and capacitance are formed which, when taken with the equivalent impedances of the crystal, constitute a low-pass filter having the desired bandwidth and impedance level. By proper design a crystal device so constructed may then be used upward toward the millimeter wave frequency range as well as at very low frequencies.

Having designed the distributed constants of the crystal cartridge in accordance with the invention so as to achieve a specified impedance which, in conjunction with the point contact crystal, is substantially constant over a broad frequency range, it is essential to provide means for connecting such cartridge to the system in which it is to be used in such a manner as to assure that the desired distributed parameters are in fact realized. If the relative positions of the points of contact between the cartridge and its holder vary, the relative proportioning of the distributed capacity and inductance of the cartridge will be disturbed. In an effort to produce a measure of consistency in the past it has been necessary to tightly fasten the cartridge in its holder. This has resulted very often in damaged crystals and at best the reproductibility of the results with replacement has been poor.

It is, therefore, a further object of the invention to connect crystal cartridges to electrical signaling circuits in a safe and consistent manner.

In accordance with the invention, a pair of parallel spaced spring wires are placed within the recess into which the cylindrical conductive members, which constitute the cartridge ends, are fitted. The spring wires are arranged perpendicular to the axis of the cartridge. At least one of the spring wires is free to move radially within the recess as the cartridge is inserted. When in position, the two wires make firm contact along the two sides of each conductive end member.

It is a feature of the invention that it is the clamping springs which physically hold the cartridge and which make electrical contact thereto rather than the pressure of the holders themselves, which is often too great, causing the crystals to be damaged. By making the overall distance between the ends of the crystal holder very slightly larger than the cartridge, contact with the crystal will always be made in the same relative position. Thus, the input impedance of the crystal rectifier unit will not vary as crystals are replaced nor will the impedance be in any way a function of the pressure upon the cartridge.

These and other objects and features, the nature of the present invention, and its various advantages, will appear more fully upon consideration of the various specific illustrative embodiments shown in the accompanying drawings and described in the following detailed description of these drawings.

Figure 1:
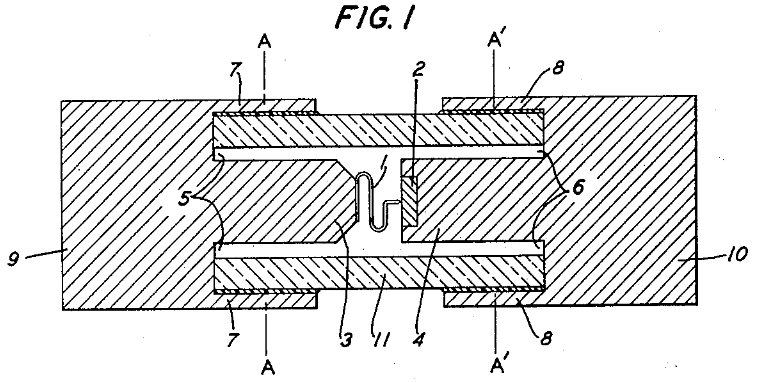
Fig. 1 is a longitudinal cross-sectional view of the crystal cartridge of the present invention.

Referring more specifically to the illustrative embodiment of the invention shown in Fig. 1, the crystal diode device is seen to include a point contact rectifier consisting of contact spring 1 mounted on post 3 and a semiconductor crystal wafer 2 mounted on post 4.

The methods used in preparing the crystal wafer and the spring contact point are similar in many respects to the standard techniques used in the manufacture of rectifiers for longer wavelengths. However, some modifications and refinements in technique are called for by a decrease in size and the increased frequency of operation.

As an example, a single-crystal ingot, grown from high purity du Pont silicon doped with 0.02 percent boron may be used to furnish the material for the crystal wafer 2 used in the unit. Slices cut from the ingot are polished and heat treated. Gold is evaporated on the back surface and the slices are diced into squares. These squares are pressed into indentations formed in the end of center post 4 which has previously been tin-plated. The spring contact 1 is made of pure tungsten wire that has been sized by an electrolytic etching process. A short length of this wire is spot-welded on the end of center post 3. The wire is then bent into the S configuration in a forming jig. By an electrolytic process the spring is then cut to the proper length and pointed. In the final assembly of the unit the contact spring is pressed into place until the desired contact is made with the silicon as evidenced by an oscilloscopic display of the voltage current characteristic.

Figure 2:
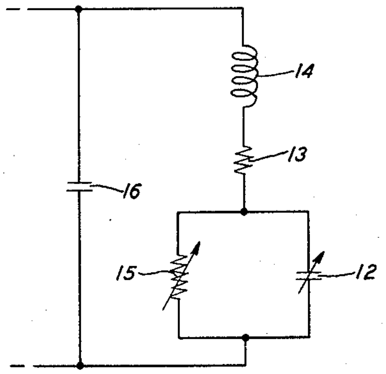
Fig. 2 is the equivalent circuit of a point contact crystal rectifier.

The equivalent circuit of the point contact region of a crystal diode is shown in Fig. 2. It consists of a nonlinear barrier layer resistance 15 shunted by a nonlinear barrier layer capacitance 12, the two being in series with a spreading resistance 13 and a contact spring inductance 14. Shunted across the entire network is the post capacitance 16 consisting of the capacity associated with posts 3 and 4. This capacity may be varied within limits by shaping the ends as shown, for example, by the tapered end of post 3.

As a first order approximation, however, spreading resistance 13 and spring contact inductance 14 may be neglected, particularly the latter, which in accordance with the present invention is made extremely small physically. Essentially then, there remains a resistance 15 in parallel with the capacitances 12 and 16. The range of values of resistance 15 and capacitance 12 are determined when contact spring 1 is pressed into place and contact made with the crystal wafer 2. However, they will assume a particular value when in use which is a function of their electrical environment.

Thus, it is evident as indicated above, that the input impedance of the crystal rectifier, as evidenced by its equivalent circuit, is a function of frequency, and as such, will not lend itself to broad band operation. To enhance the usefulness of crystal diodes, compensating impedances are incorporated into the cartridge structure in the form of conductive end members 9 and 10, so dimensioned and shaped as to tend to neutralize the frequency sensitive characteristic of the crystal rectifier impedance. The neutralizing impedances include the two annular recesses 5 and 6 which have been cut into end members 9 and 10, respectively, and the circumferential rings 7 and 8 which are consequently formed. Also formed are the posts 3 and 4 mentioned above.

The end members 9 and 10 may be constructed out of solid stock, or in parts that are subsequently assembled. For example, center posts 3 and 4 may be made of nickel or some other suitable conductive material, press-fitted into members 9 and 10, or otherwise fixed in final position.

The annular recesses 5 and 6 form reentrant sections, which if made small compared to a quarter of a wavelength at the highest frequency at which it is designed to operate, constitute inductances which are independent of frequency.

The conductive rings 7 and 8 constitute a shunting capacitance whose value is a function of the thickness and spacing of end members 9 and 10, and the dielectric material separating them.

Surrounding and enclosing center posts 3 and 4 is a nonconducting thin hollow cylindrical sleeve 11, which is received in recesses 5 and 6 and cemented in place. Sleeve 11 protects the point contact crystal and forms a support and spacer for members 9 and 10. Since the dielectric constant of sleeve 11 will influence the value of the shunting capacitance across rings 7 and 8, the choice of material used affords a convenient way to adjust this capacitance to the desired value.

Figure 3:
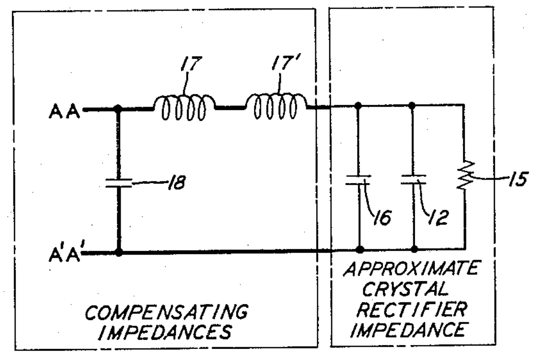
Fig. 3 is the equivalent circuit of the point contact crystal and cartridge of the present invention.

Fig. 3 is a schematic of an approximate equivalent circuit of the complete rectifier unit, including the point contact crystal rectifier and cartridge case. It includes, in addition to resistance 15 and capacitances 12 and 16, the compensating reactances consisting of inductances 17 and 17' and capacitance 18. Inductances 17 and 17' are a measure of the impedance of the reentrant sections 5 and 6 which form a shorted section of transmission line. Capacitance 18 represents the capacitance between the outer rings 7 and 8 and may be varied by the choice of material used in sleeve 11 and the spacing between 7 and 8.

By properly dimensioning, the cartridge capacitance 18 may be made equal to the sum of capacitances 16 and 12, forming the well-known constant *k* type of low-pass filter. By including within the filter network the crystal capacitance 12, and eliminating any impedance transformation within the cartridge, the device may now be used at all frequencies below cutoff and will tend to appear substantially as a resistance, independent of frequency. Alternately, the cartridge may be designed for some specific impedance transformation for special applications, by varying the dimensions and thereby varying the parameters 16, 17, 17' and 18.

Figure 4:
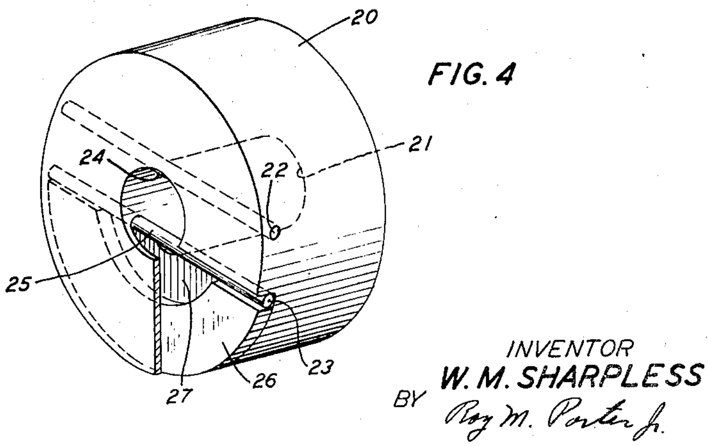
Fig. 4 is a clamping insert to be used in conjunction with the crystal cartridge of Fig. 1.

Having designed and constructed the crystal cartridge in accordance with the principles of the invention, to have a specified resistance over a particular frequency range, the design has meaning only insofar as the electrical contacts made with the cartridge, when used, are made at the same places as those for which the equivalent cartridge circuit was designed. For example, inductances 17 and 17', the inductances of the reentrant portions 5 and 6 of end members 9 and 10, are calculated with reference to planes AA and A'A', respectively. This means that when the crystal device of Fig. 1 is used in a radio signaling system, contact between that system and the cartridge must be made along planes AA and A'A' to obtain results that are consistent with the calculated data. In Fig. 4, there is shown a clamping insert to be used in conjunction with a crystal cartridge holder to assure proper contact between the latter and the signal system.

The clamping insert may comprise a cylindrical block of metal 20, such as brass, through which there is a hole 21 to receive the crystal cartridge. Diametrically opposite each other, and extending parallel to each other are holes 22 and 23 into each of which there is inserted resilient material as, for example, Phosphor bronze wire, to form two spring contacts 24 and 25, which extend into the region of hole 21. The springs are soldered at one end only. A slot 26 is cut in the region below hole 23, and then partially refilled, leaving a hollow region 27 into which spring 25 may move. When a crystal cartridge is inserted into hole 21, spring 25 is forced into region 27, firmly clasping the cartridge between itself and spring 24.

Two such clamping inserts are provided to clamp both ends of the crystal cartridge. They may be identical inserts but in general they will differ, depending upon the nature of the connecting circuits. The use of such inserts is illustrated in Fig. 5.

Figure 5:
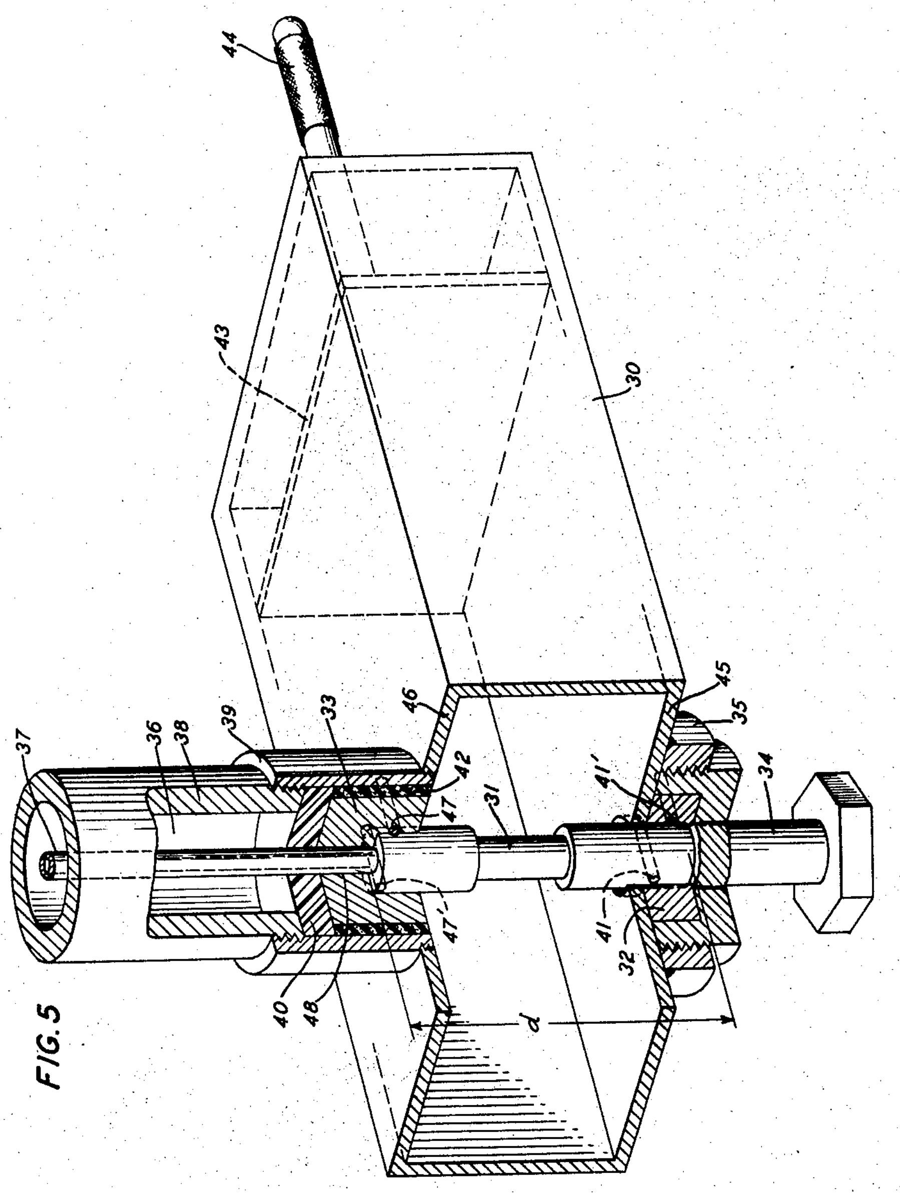
Fig. 5 is a cross-sectional view of a complete crystal cartridge holder as used in conjunction with the crystal of Fig. 1 and a rectangular waveguide.

Fig. 5 shows an illustrative embodiment of a complete cartridge holder as used in conjunction with a conductively bound waveguide 30 and incorporating therein the features of the present invention. The arrangement shown includes a lower portion and an upper portion for holding the crystal cartridge, the latter extending across the narrow dimension of the waveguide to intercept electro-magnetic wave energy propagating therethrough. The lower portion of the holder conductively grounds one end of the carriage and also provides easy access to the cartridge. The upper portion provides means for connecting the other end of the cartridge to a low frequency circuit which, for example, may be an intermediate frequency amplifying system.

Both portions of the cartridge holder may be rigidly mounted to the waveguide, as shown in Fig. 5 or means may be provided whereby the unit may be moved transversely to the waveguide to obtain a resistive match to the guide. If the holder can not be moved, matching may be accomplished by reducing the narrow dimension of the waveguide in steps (not shown) until the height of the guide is approximately the same as the height of the cartridge unit.

The lower portion of the holder comprises a threaded stub 34, into which a clamping insert 32 is press fit. Clamping insert 32 is similar to the insert shown in Fig. 4 and described in detail above. Stub 34 engages a threaded ring 35 which is rigidly fastened to a wide side 45 of waveguide 30. The cartridge 31 is firmly held by springs 41 and 41' and when fully engaged, stub 34, in conjunction with insert 32, conductively ground the lower end of crystal cartridge 31 to guide wall 45. Cartridge 31 may be readily removed by unscrewing and withdrawing stub 34.

The upper portion of the cartridge holder comprises the threaded sleeve 39 to which there is cemented a clamping insert 33 and the insulating ring 40. The cement 42, in addition to holding clamping insert 33 in place, insulates the insert from sleeve 39, which threads into an aperture in the wide side 46 of guide 30. In addition to their mechanical functions, clamping insert 33, and sleeve 39 constitute a high frequency by-pass capacity.

Clamping insert 33 differs slightly from the insert shown in Fig. 4 in that the hole diameter changes abruptly forming a constricted region 48 to receive element 37. The other features of insert 33 are as described above and shown in Fig. 4.

The upper end of crystal cartridge 31, held in place by springs 47 and 47', connects to the intermediate frequency output coaxial cable plug 36 which has a threaded outer sleeve 38 that screws into the inside threaded end of sleeve 39. When fully engaged, plug 36 rests on insulating ring 40, thereby separating sleeve 38 from insert 33. Inner conductor 37 of plug 36 extends through insulating ring 40 and insert 33, making contact with the upper end of cartridge 31 by virtue of its contact with the constructed portion 48 of insert 33.

The overall distance $d$ from the lower end of constructed region 48 of insert 33 to the lower end of insert 32, is only slightly larger than the overall length of the cartridge. Thus, there is no danger of breaking the crystal cartridge when the coaxial plug 36 and grounding stub 34 are tightened up. The latter two elements are not required to make intimate contact with the cartridge since the necessary electrical contacts are made by springs 41, 41' and 47, 47'. In addition to removing the danger of breakage, the springs make positive contact in the same relative position at all times thus assuring that the impedance seen by the wave energy traveling past will not vary as a function of pressure with which plug 36 and stub 34 have been tightened.

Terminating guide 30, at approximately odd multiples of a quarter of a wavelength away, is shorting piston 43 which may be adjusted longitudinally along the guide by means of handle 44. The reflected impedance produced by piston 43 in shunt with crystal 31 is very large and essentially all the wave energy incident upon the crystal is absorbed by crystal 31.

In all cases, it is understood that the above-described arrangements are simply illustrative of the small number of the many specific embodiments which can represent applications of the principles of the invention. Numerous and varied other arrangements can readily be devised in accordance with these principles by those skilled in the art without departing from the spirit and scope of the invention.

What is claimed is:

1. In combination, a microwave circuit component for electromagnetic wave energy proportioned to have a given frequency response when contacted at a predetermined region along an end and means for contacting said component comprising a metal member having a cylindrical aperture therein for receiving said end of said component, a pair of holes extending through said member containing resilient wires, each of said wires passing through a region on opposite sides of said aperture, at least one of said wires being free to move radially with respect to said aperture, said wires firmly holding said component end and making a positive and reproducible electrical contact between said end and said holder.

2. A nonlinear microwave component for electromagnetic wave energy having a predetermined compensated frequency response comprising in combination a point contact crystal rectifier, a cartridge assembly for said rectifier, a cartridge holder and an electromagnetic wave path, said cartridge assembly comprising a pair of cylindrical conductive members each having an annular recess in one end between a center conductive post and a circumferential conductive ring, said members being received through opposite sides of said wave path, a crystal element supported by one of said posts, a contact element extending from the other of said posts to contact said crystal, said recesses having dimensions coordinated with the remaining parameters of said structure when contacting said structure at a predetermined region of said members to introduce a compensating inductive reactance to electromagnetic wave energy passing between facing recesses and impinging upon said crystal, and means for contacting each of said members at said predetermined region comprising two pairs of wires held in fixed relationship with respect to said wave path at said opposite sides of said path, at least one wire in each of said pairs being free to move with respect to the other of said wires, each of said members being received between said pairs of wires, said wires firmly holding said members and making positive and reproducible electrical contact between said path and said predetermined region of said cartridge.

References Cited in the file of this patent

UNITED STATES PATENTS

| | | |
|---|---|---|
| 2,503,256 | Ginzton et al. | Apr. 11, 1950 |
| 2,546,061 | De Beauvais | Mar. 20, 1951 |
| 2,639,393 | Birt et al. | May 19, 1953 |
| 2,777,949 | Haard | Jan. 15, 1957 |
| 2,783,378 | Vogeley et al. | Feb. 26, 1957 |
| 2,807,731 | Minnich | Sept. 24, 1957 |